(12) United States Patent
Best

(10) Patent No.: US 7,450,535 B2
(45) Date of Patent: Nov. 11, 2008

(54) PULSED SIGNALING MULTIPLEXER

(75) Inventor: Scott C. Best, Palo Alto, CA (US)

(73) Assignee: Rambus Inc., Los Altos, CA (US)

( * ) Notice: Subject to any disclaimer, the term of this patent is extended or adjusted under 35 U.S.C. 154(b) by 8 days.

(21) Appl. No.: 11/292,686

(22) Filed: Dec. 1, 2005

(65) Prior Publication Data

US 2007/0127404 A1 Jun. 7, 2007

(51) Int. Cl.
 *H04Q 7/00* (2006.01)
(52) U.S. Cl. .................. 370/314; 370/205; 370/211; 370/465; 370/342; 370/522; 375/257; 375/260; 375/354; 455/69
(58) Field of Classification Search ........... 370/314, 370/205, 211, 208
 See application file for complete search history.

(56) References Cited

U.S. PATENT DOCUMENTS

| | | | |
|---|---|---|---|
| 2,420,374 A | 5/1947 | Houghton | |
| 3,593,207 A | 7/1971 | Woermbke | |
| 3,619,504 A | 11/1971 | De Veer | |
| 3,671,868 A | 6/1972 | Sanders | |
| 3,781,716 A | 12/1973 | Gerst | |
| 4,216,446 A | 8/1980 | Iwer | |
| 4,234,952 A | 11/1980 | Gable | |
| 4,273,428 A | 6/1981 | Borowski | |
| 4,280,221 A | 7/1981 | Chun | |
| 4,298,930 A | 11/1981 | Haubner | |
| 4,376,921 A | 3/1983 | Dickens | |
| 4,725,836 A | 2/1988 | Guidos | |
| 4,794,620 A | 12/1988 | Moore | |
| 4,836,033 A | 6/1989 | Seitz | |
| 5,022,051 A * | 6/1991 | Crandall et al. | 375/292 |
| 5,068,630 A | 11/1991 | Gris | |
| 5,170,140 A | 12/1992 | Lowe | |
| 5,189,432 A | 2/1993 | Lombardi | |
| 5,243,305 A | 9/1993 | D'Oro | |
| 5,365,205 A | 11/1994 | Wong | |

(Continued)

FOREIGN PATENT DOCUMENTS

EP 0714130 5/1996

(Continued)

OTHER PUBLICATIONS

Bhattacharya, D., et al, "Empirical Relations for Capacitive and Inductive Coupling Coefficients of Coupled Microstrip Lines" Apr. 1981, IEEE Transactions on Microwave Theory and Techniques, vol. 4, pp. 386-388.

(Continued)

*Primary Examiner*—Marceau Milord
(74) *Attorney, Agent, or Firm*—Shemwell Mahamedi LLP

(57) ABSTRACT

In one embodiment, a pulsed signaling multiplexer is described that comprises a first AC-coupled transmitter and a second AC-coupled transmitter. The first AC-coupled transmitter includes a first driver having a first input to receive first data and a first output. A first AC-coupling element couples the first output to a common output node. The second AC-coupled transmitter includes a second driver having a second input to receive second data, and a second output. A second AC-coupling element couples the second output to the same first common output node.

30 Claims, 5 Drawing Sheets

U.S. PATENT DOCUMENTS

| | | | |
|---|---|---|---|
| 5,621,913 | A | 4/1997 | Tuttle et al. |
| 5,629,838 | A | 5/1997 | Knight et al. |
| 5,638,402 | A | 6/1997 | Osaka |
| 5,694,516 | A | 12/1997 | Grewe |
| 5,786,979 | A | 7/1998 | Douglass |
| 5,907,251 | A | 5/1999 | Houghton |
| 6,037,884 | A | 3/2000 | Thornton |
| 6,107,910 | A | 8/2000 | Nysen |
| 6,496,889 | B1 | 12/2002 | Perino |
| 6,500,696 | B2 | 12/2002 | Sutherland |
| 6,559,531 | B1 | 5/2003 | Sutherland |
| 6,674,772 | B1 * | 1/2004 | Dally et al. .................. 370/539 |
| 6,710,436 | B1 | 3/2004 | Harris et al. |
| 6,721,368 | B1 * | 4/2004 | Younis et al. ................ 375/295 |
| 6,728,113 | B1 | 4/2004 | Knight |
| 6,854,030 | B2 | 2/2005 | Perino |
| 7,061,989 | B2 * | 6/2006 | Bellaouar et al. ........... 375/295 |
| 7,072,380 | B2 * | 7/2006 | Ozluturk et al. ............. 375/141 |
| 7,088,398 | B1 * | 8/2006 | Wolf et al. ................ 348/423.1 |
| 7,133,648 | B1 * | 11/2006 | Robinson et al. .............. 455/88 |
| 7,194,028 | B2 * | 3/2007 | Agazzi et al. ................. 375/233 |
| 7,209,061 | B2 * | 4/2007 | Somayajula ................. 341/122 |
| 7,221,723 | B2 * | 5/2007 | Walker ....................... 375/355 |
| 7,227,918 | B2 * | 6/2007 | Aung et al. .................. 375/355 |
| 7,292,629 | B2 * | 11/2007 | Zerbe et al. .................. 375/229 |
| 2002/0191835 | A1 | 12/2002 | Lu et al. |
| 2002/0196883 | A1 | 12/2002 | Best |

FOREIGN PATENT DOCUMENTS

| | | |
|---|---|---|
| JP | 60107901 A2 | 6/1985 |
| WO | WO2004/012265 | 2/2004 |

OTHER PUBLICATIONS

Deutsch et al, "When are Transmission-line Effects Important for On-chip Interconnections?" Oct. 1997, IEEE Transactions on Microwave Theory and Techniques, vol. 45, pp. 1836-1846.

Gabara, T. J., "Capacitive Coupling and Quantized Feedback Applied to Conventional CMOS Technology", IEEE Journal of Solid State Circuits, vol. 32, No. 3, (Mar. 1997).

Hayden, L. A., "Pulse Signaling Using Capacitively-Coupled CMOS", IEEE publication (1994).

Hoffman, K. et al., "High Speed Capacitive Coupled Interface for Multipoint Connections", Proc. 1994 IEEE Multi-Chip Module Conference, pp. 95-101, (Mar. 1994).

International Search Report and Written Opinion of the International Searching Authority in International Application PCST/US2006/045830, European Patent Office, Feb. 20, 2008, 15 pages.

International Search Report and Written Opinion of the International Searching Authority in International Application PCST/US2006/012647, European Patent Office, Jan. 26, 2007, 13 pages.

Knight, T. Jr et al., "Manufacturability of Capacitively Coupled Multichip Modules", IEEE Transaction on Components, Packaging, And Manufacturing Technology-Part B vol. 18, No. 2, (May 1995).

Knight, T. Jr. et al., "Capacitive Coupling Solves the Known Good Die Problem", Proc. 1994 IEEE Multi-Chip Module Conference, pp. 95-101, (Mar. 1994).

Knight, T. Jr. et al. "Application of Capacitive Coupling to Switch Fabrics", IEEE publication (1994).

Lowther, Rex et al, "Substrate Parasitics and Dual-Resistivity Substrates" Jul. 1996, IEEE Transactions on Microwave Theory and Techniques, vol. 44, pp. 1170-1174.

Osaka, H. et al., "1GT/s Back Plane (XTL: Crosstalk Transfer Logic) using Crosstalk Mechanism", Hot Interconnects A Symposium on High Performance Interconnects, pp. 141-147, (Aug. 1997).

Schmidt, A. et al., "High Speed capacitive coupled interface for multipoint connections", Proceedings of the 25th European Duisberg, Germany, Sep. 21-23, 1999, IEEE Sep. 21, 1999, pp. 138-141.

International Preliminary Report on Patentability for International Application PCT/US2006/045830, The International Bureau of WIPO, Jun. 3, 2008, 9 pages.

* cited by examiner

PULSED SIGNALING MULTIPLEXER

BACKGROUND

1. Field

The disclosure presented herein relates to pulsed signaling systems, and more particularly to a multiplexer for use in a pulsed signaling system.

2. Description of the Related Art

Power dissipation is an important factor affecting high-speed signaling rates. A useful metric in this context involves a ratio of milliwatts (mW) expended per gigabits-per-second (Gbps) of signaling rate. As an example, a high-performance signaling system may consume 30 mW/Gbps per signaling interface. For a sixteen-bit wide memory interface running at 3.2 Gbps, the total power of the signaling interface may exceed 1500 mW, on both the memory controller and memory device sides of the interface.

To minimize link interface power, those skilled in the art have proposed using capacitively-coupled interconnects (CCI) to carry out capacitively-coupled pulse signaling (CCPS). In this signaling scheme, power dissipates during signal transitions—i.e., during the "AC" portion of the signal. Unlike most other types of common electrical signaling (eg, non-return-to-zero, or "NRZ" signaling), little to no power dissipates during the "DC" portion of the signal. This results in a dramatic decrease in the mW/Gbps metric described above.

What is needed and as yet unavailable are improvements in CCI and CCPS circuits and methods to enable high-speed signaling in low power memory systems. The architectures and methods described herein satisfy this need.

DETAILED DESCRIPTION

Figure 1:
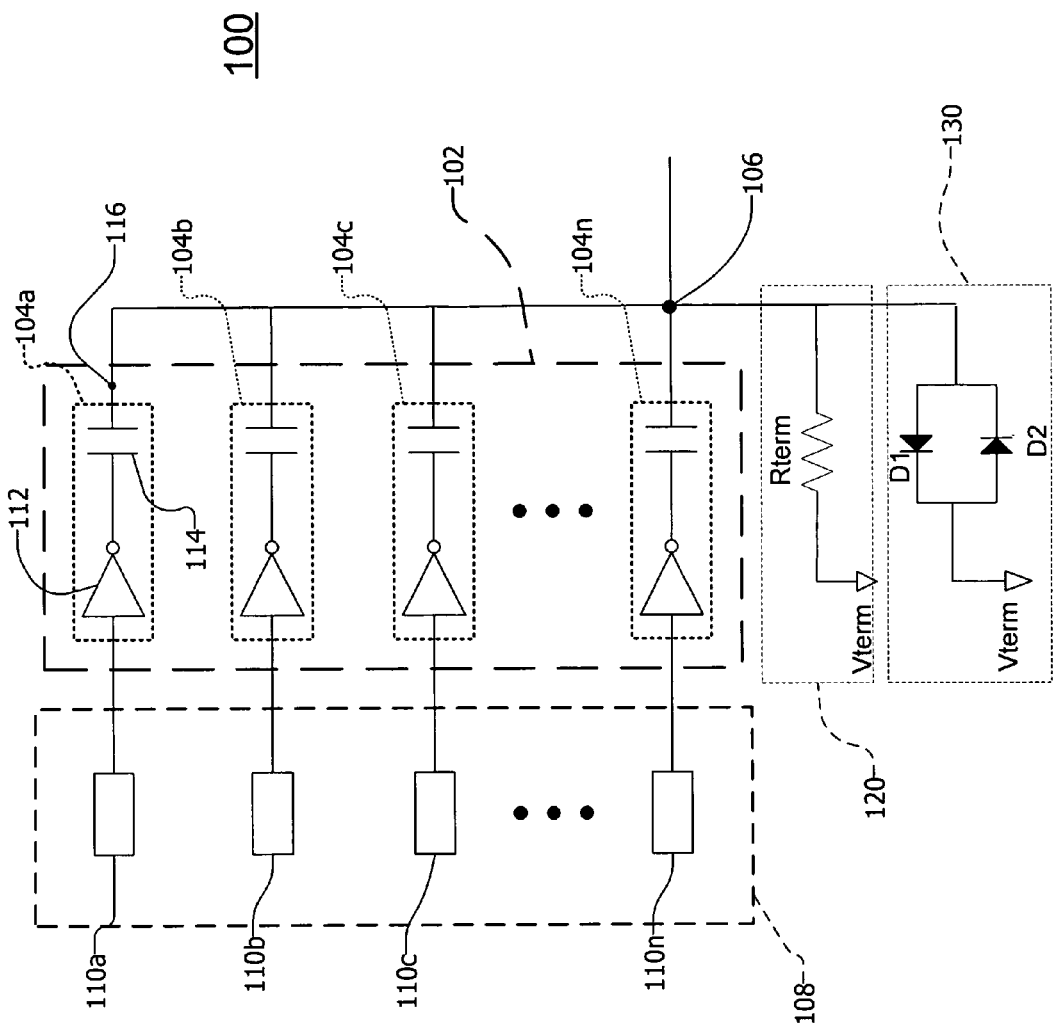
FIG. 1 is a high-level block diagram of a multiplexer for use on an integrated circuit.

In the following description and in the accompanying drawings, specific terminology and drawing symbols are set forth to provide a thorough understanding of the disclosure presented herein. In some instances, the terminology and symbols may imply specific details that are not required to practice the disclosed subject matter. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. Also signals referred to herein as clock signals may alternatively be strobe signals or other signals that provide event timing.

With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as connections through one or more intermediary circuits or structures. "AC-coupled" or "AC-coupling" refers to a capacitive or inductive interconnection between two nodes. An AC-coupled transmitter refers to a signal transmission circuit having a signal driver and an AC coupling between the signal driver and an output node of the AC-coupled transmitter. The term "exemplary" is used herein to express an example, not a preference or requirement.

Methods, devices and systems that employ a parallel array of AC-coupled transmitters having a common output node to receive a multiplexed data output are disclosed herein in various embodiments.

In one embodiment, a pulsed signaling multiplexer is described that comprises a first AC-coupled transmitter and a second AC-coupled transmitter. The first AC-coupled transmitter includes a first driver having a first input to receive first data and a first output. A first AC-coupling element couples the first output to a common output node. The second AC-coupled transmitter includes a second driver having a second input to receive second data, and a second output. A second AC-coupling element couples the second output to the same first common output node.

In a further embodiment, a signal communications apparatus is described that comprises a first plurality of AC transmitters connected to a first common output terminal. The first plurality of AC transmitters have respective signal outputs that are multiplexed on the first common output terminal.

In yet another embodiment, a pulsed signaling system is described that comprises a first integrated circuit including an AC-coupled transmitter circuit and timing circuitry coupled to the AC-coupled transmitter circuit. The timing circuitry has a clock signal input to receive a clock signal. A second integrated circuit couples to the first integrated circuit and includes a clock generator to generate the clock signal.

In a further embodiment, a method of transmitting a plurality of signals on a first integrated circuit is described. The method comprises providing data signals on a plurality of signal paths and phase-shifting the data on the plurality of signal paths. The phase-shifted data on the plurality of signal paths is fed to a plurality of AC-coupled transmitters. Pulsed representations of the data are generated by the AC-coupled transmitters, and output from the plurality of AC-coupled transmitters to a common output node. The pulsed representations on the common output node define a time multiplexed data stream.

Referring now to FIG. 1, a pulsed signaling multiplexer 100 is shown that includes timing circuitry 108 comprising a plurality of timing circuits 110a-n coupled to transmitter circuitry 102. The transmitter circuitry includes an array of AC-coupled transmitter circuits 104a-n that generate pulsed output signals. A common output node 106 receives the plurality of transmitter output signals in a time-multiplexed manner as more fully described below. By transmitting signals in this fashion, significant improvements in signal throughput and power efficiency for integrated circuits may be realized.

Further referring to FIG. 1, the plurality of AC-coupled transmitters 104a-n may be disposed in a parallel configuration with respective outputs tied together to the common output node 106. For purposes of clarity, only one transmitter 104a will be described in detail, it being understood that all of the transmitters are substantially similar in construction. Each transmitter includes an amplifier circuit or driver 112 such as a CMOS inverter, for example. The output of the driver feeds an AC-coupling element such as a series capacitor 114 that includes an output terminal 116 for directing an AC output signal to the node 106.

Each series capacitor 114 may have a capacitance on the order of around 50-150 fF (femto-Farads), and may be manufacturable through standard CMOS fabrication techniques. Moreover, it should be understood that, depending on the application, the AC-coupling element may comprise a portion of a series capacitor, that for example, may cooperate with another portion of a series capacitor at a receiver end to effect an entire capacitor structure. This enables flexibility for chip-to-chip applications where, for example, the contactless interconnect between two adjacent integrated circuits may be a series capacitor structure. Other alternatives are available as well, such as inductors to effect inductive coupling between chips.

Figure 2:
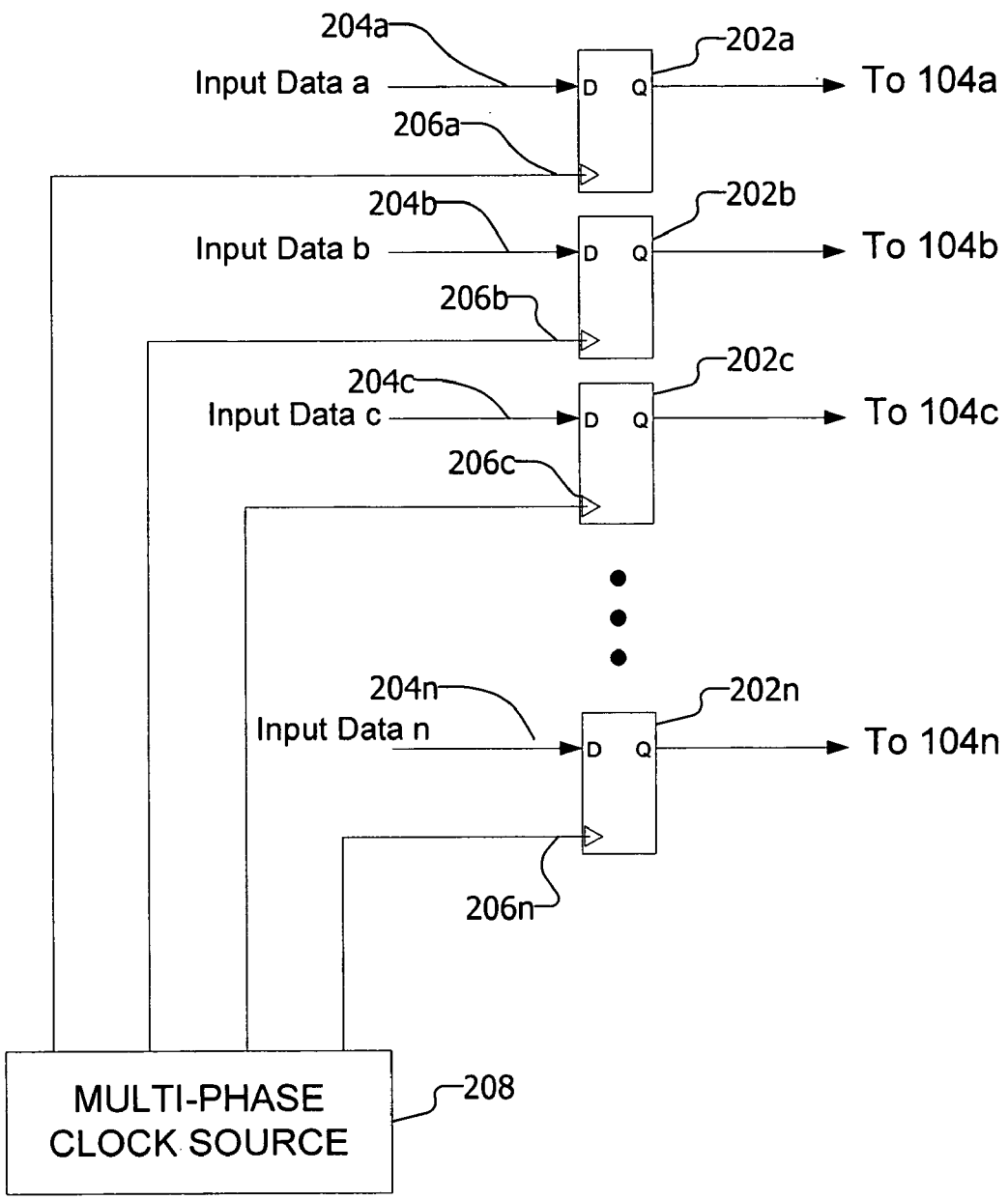
FIG. 2 is a timing circuit for use with the multiplexer of FIG. 1.

The timing circuitry 108 provides signal offsets for input to the plurality of transmitter circuits 104a-n. FIG. 2 illustrates one embodiment of the timing circuitry, generally designated 200, for use with the transmitters described above. A plurality of flip-flops 202a-n are disposed at each transmitter input (not shown), and have respective data input lines 204a-n and clock lines 206a-n to receive independent data and clock signals. A multi-phase clock generator or source 208 provides a plurality of N clock signals that are offset in phase by desired phase increments. The phase offset clock signals are then fed to the clock inputs for the flip-flops. Suitable multi-phase clock generators are commonly realized using simple delay lines, oscillator-fed delay-locked-loop (DLL) circuits, or phase-locked-loop (PLL) circuits, where offset clock signals may be tapped following each delay element in a delay line (for the DLL), or each element in a ring oscillator (for the PLL).

Alternatively, the timing circuitry 208 may comprise a plurality of programmable or variable delay elements (not shown) to offset data signals being input to the transmitter circuitry 102. Static weighted delay elements might also be used to provide the different delays. Additionally, while the timing circuitry described above is implemented upstream of each AC-coupled transmitter input, similar benefits may be realized by employing the timing circuitry between the outputs of the drivers and the series capacitors.

Referring back to FIG. 1, to maximize the bandwidth of the transmission channel, the multiplexer described above may employ termination circuitry 120 in the form of a termination resistor Rterm coupled between the node 106 and a termination voltage terminal Vterm. For applications involving relatively short transmission channel lengths, such as "system-in-package" (SiP) environments, the termination resistor Rterm may be realized by an on-chip resistor implementation. It should be understood that the termination resistor may be realized through many different alternative embodiments, including single or multiple resistor implementations, transistor circuitry to effect a resistive output, and the like.

Due to the loading of multiple capacitive elements in parallel, the signal amplitude on node 106 generated by any one of the individual AC transmitters is reduced compared to how the transmitter would perform in isolation. However, due to the non-zero output impedance of the driver circuit 112, the attenuation effect can be kept to reasonable levels. In an alternative embodiment, the output impedance of the driver circuit 112 may be increased, thereby decreasing the signal attenuation effect, by employing a tri-state driver in each transmitter 104. Such drivers are configured to exhibit a high impedance output when operating in a non-driving mode.

In some applications, electrostatic discharge (ESD) protection circuitry 130 may be disposed in parallel with the termination resistor Rterm. The ESD circuitry may include a pair of reverse-biased diodes D1 and D2 tied between the node 106 and the termination voltage Vterm. Due to the AC-coupled natured of the pulsed signaling multiplexer 100, the ESD circuit complexity may be minimized.

In one embodiment, the pulsed signaling multiplexer 100 and its supporting circuitry may be realized by circuitry employed on a single integrated circuit. In other embodiments, as more fully described below, one or more support circuits employed by the multiplexer may be implemented on a second integrated circuit.

Figure 3:
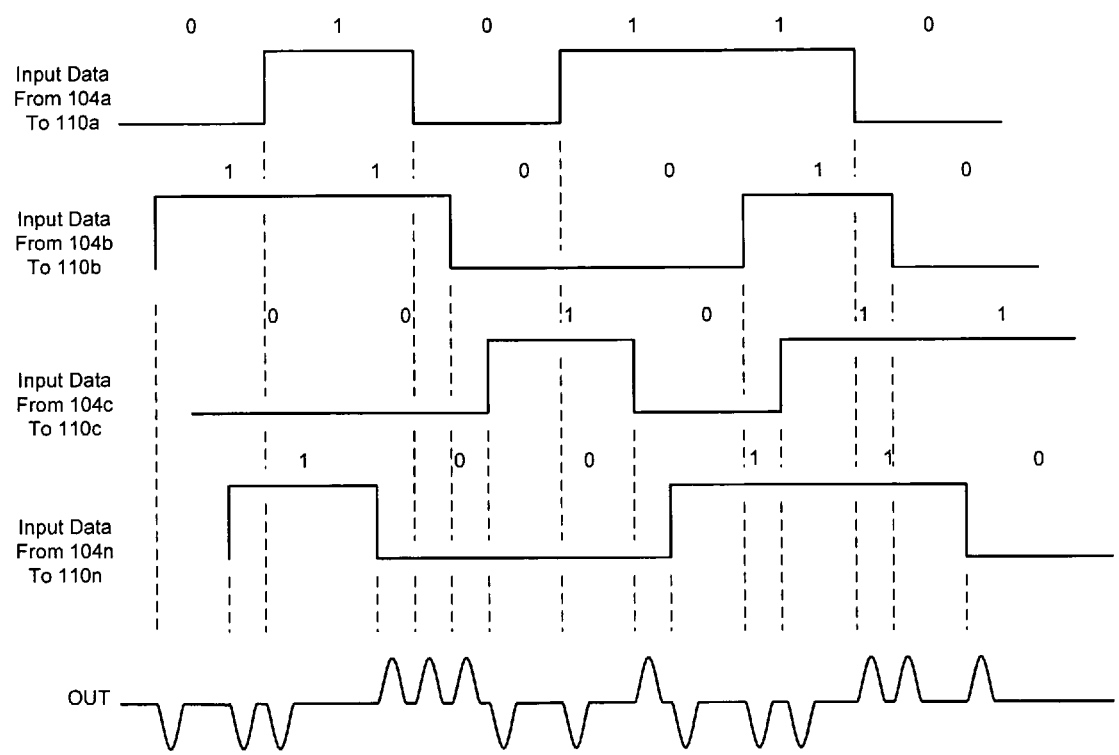
FIG. 3 is a timing diagram for the multiplexer of FIG. 1.

In operation, data signals are fed along independent data paths to the timing circuitry 108, where they are re-timed (or offset). The re-timing allows the multiplexer transmitters 104a-n to receive at their inputs data signals that are precisely offset in phase with respect to each other. FIG. 3 illustrates an example of the timing relationships between the input data fed from the timing circuitry to the AC-coupled transmitters 104a-n, and the combined output data pulse stream at the common node 106.

As shown in FIG. 3, each transmitter signal output may be offset by an incremental phase. Due to the high-pass filtering nature of the series capacitor, the transmitter output comprises a brief pulse corresponding to the rise and fall times of the input data edge transitions. Since only signal transitions appear at the output of each transmitter, pulses appear on the output node for each signal transition in "wired-OR" manner. This, in effect, provides a dramatic increase in the signaling rate at the output node 106. In one embodiment, where eight transmitters may be arrayed in parallel with a single output, and offset in phase by 1/8 a symbol period (half the multi-phase clock period), a very low power parallel-to-serial transmitter circuit is achievable.

Figure 4:
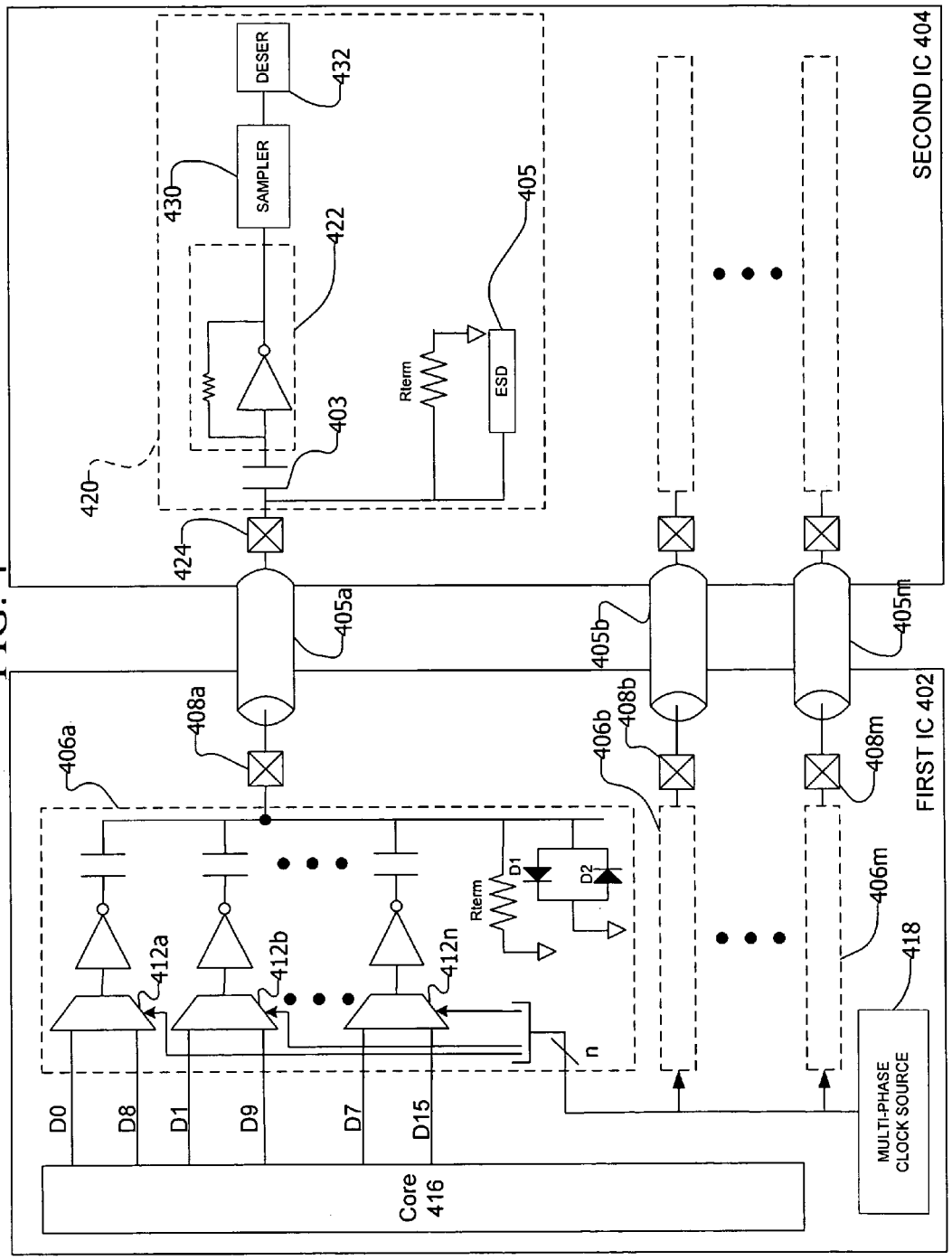
FIG. 4 is a high-level block diagram of an embodiment of a memory subsystem employing the multiplexer of FIG. 1.

FIG. 4 illustrates an embodiment of a pulsed signaling system, generally designated 400, that employs an embodiment of the pulsed signaling multiplexer described above. The system includes a first integrated circuit (IC) 402 coupled to a second integrated circuit 404 via a plurality of transmission lines 405a-m. The first IC, or chip, includes a plurality of capacitively coupled transmitter arrays 406a-m for providing multiplexed output signals to respective output pads 408a-m. For purposes of clarity, only one of the transmitter arrays is shown in detail, it being understood that additional transmitter arrays generally comprise respective copies of the resources shown. The transmitter arrays are clocked by timing circuitry disposed on the first IC 402, and the vterm voltage used by each transmitter is simply DC ground.

In the embodiment illustrated in FIG. 4, the first IC 402 may comprise a dynamic random access memory (DRAM) device. The DRAM device may include a memory core 416 accessible through a memory interface defined in part by the timing circuitry and the transmitter arrays. While not described here in detail, the memory core generally includes an array of memory cells, organized into rows and columns, and each of which are accessible through appropriate activation of row and column circuitry (not shown). The memory interface generally includes the Input/Output (I/O) circuitry such as the row and column decoders, clocking circuitry, clock recovery circuitry, and the time multiplexed output circuitry described herein.

With continued reference to FIG. 4, in one specific embodiment, parallel signal path outputs from the memory core 416 define a sixteen-bit wide interface (two bytes of data, where each byte comprises eight bits) that may be fed through an array of 2:1 multiplexers 412a-n to reduce the number of core signal output paths in half, to eight. The resulting multiplexed data paths are then individually re-timed for precision delayed application to the AC-coupled transmitter circuits.

The timing circuitry employed by the DRAM 402 may include a derivative of the multi-phase clocking technique described above. By taking advantage of the tapped delay lines from a multi-phase clock source 418, a plurality of precision clock signals offset by desired phase increments may be utilized in a straightforward manner. For the embodiment illustrated in FIG. 4, one of n clock signals may be used to clock each of the 2:1 multiplexers 412a-n, whose outputs may be fed directly to the array of AC-coupled transmitters. For a DLL having an N+1 element delay line, N clock signals of varying phase offsets may be tapped from the respective delay element outputs to provide the desired clock offsets to the 2:1 multiplexers.

With continued reference to FIG. 4, the second integrated circuit 404 may comprise an application specific integrated circuit (ASIC) such as a memory controller or a signal conversion buffer (e.g., a circuit for converting pulse-mode signals received from IC 402 into one or more other types of signals that are output to a downstream device, and likewise converting other types of signals received from the downstream device into pulse-mode signals that are output to IC 402; the other types of signals including, without limitation, as series-stub terminated logic (SSTL) signals, low-voltage differential signals (LVDS), current-mode logic (CML) signals, etc.). The IC 404 includes receiver circuitry 420 to receive and process the signals driven by the AC-coupled transmitter circuits of the first IC 402. Each receiver may include a series capacitor 403 disposed between an AC amplifier circuit 422, such as a signal reception inverter, and a signal I/O pad 424. An input sampler 430 is provided to sample the output of the AC amplifier and thereby generate a stream of digitized samples (i.e., received data bits) that correspond to the originally transmitted data bits. A deserializer 432 may be coupled to the input sampler to convert the time-division multiplexed samples from a serial stream of bits to parallel sets of data bits such as a bytes, double bytes, etc.). Sampling operation within the input sampler 430 may be timed (i.e., triggered) directly or indirectly by one or more clock, strobe or other timing signals received from an external source (including the first IC 402 or a separate timing signal source that outputs timing signals which, for example, propagate along side signals on transmission lines 405a-405m), recovered from the incoming pulse-mode signals, for example, using clock-data recovery techniques, or self-generated within the second IC 404 and phase aligned with desired sampling points in the incoming pulse-mode signals.

Also, like IC 402, IC 404 may include a termination resistor circuit Rterm disposed in parallel with an ESD protection circuit 405. Although a doubly-terminated signal link is illustrated in FIG. 4 (i.e., with a termination circuit, Rterm, coupled to both ends of the transmission line or other signal link 405a), the termination circuit, Rterm, may be omitted from either of ICs 402 or 404 in alternative embodiments to effect a single-ended signaling link. Also, while the termination circuits, Rterm, are illustrated as being part of the integrated circuits 402 and 404 and thus form on-chip termination elements (or on-die termination elements), either or both of the termination circuits may be disposed off-chip, for example, within an IC package that includes one or both of dice 402 and 404, on a daughter board to which IC 402 and/or IC 404 is mounted, on a mother board that includes at least a portion of the signaling link 405a or any other desirable location.

The first and second integrated circuits 402 and 404 may be coupled together via a plurality of transmission lines 405a-m that may define multi-drop or point-to-point signaling paths. In a multi-chip module (MCM) or system-in-package (SIP) environment, the first and second IC's may be disposed on a common multi-layer substrate in a planar relationship, or stacked in a vertical relationship. The transmission lines may take the form of wirebond paths, stripline paths, flex circuit paths, and the like to effect the chip-to-chip coupling.

In operation, one specific embodiment of the pulse signaling system described above may achieve a signaling rate on the order of approximately 3.2 Gbps out of the transmitter node even though the memory core signaling rate may be on the order of approximately 200 Mbps. This may be accomplished by extracting sixteen-bit (double byte) words in parallel from the core at 200 Mbps, then serializing pairs of core output data paths with the 2:1 multiplexers (doubling the data rate to 400 Mbps), followed by 8-to-1 time-division multiplexing by the AC-coupled transmitters.

The pulse signals then propagate across each transmission line where they are received and processed by the receiver circuitry 420. Once the AC signal has been processed by the input sampler 430, the resulting stream of digital samples may be deserialized (e.g., demultiplexed) by a deserializing circuit 432 to provide a parallel data output (e.g., bytes, double bytes, etc.). Although not specifically shown in FIG. 4, IC 404 may include one or more capacitively-coupled transmitter arrays 406a-406m to transmit pulse-mode signals to counterpart receiver circuitry 420 in IC 402 via transmission lines 405a-405m (in which case transmission lines 405a-405m operate as a set of bidirectional signaling links) or via a separate set of transmission lines (thus providing for unidirectional signaling, if desired).

Figure 5:
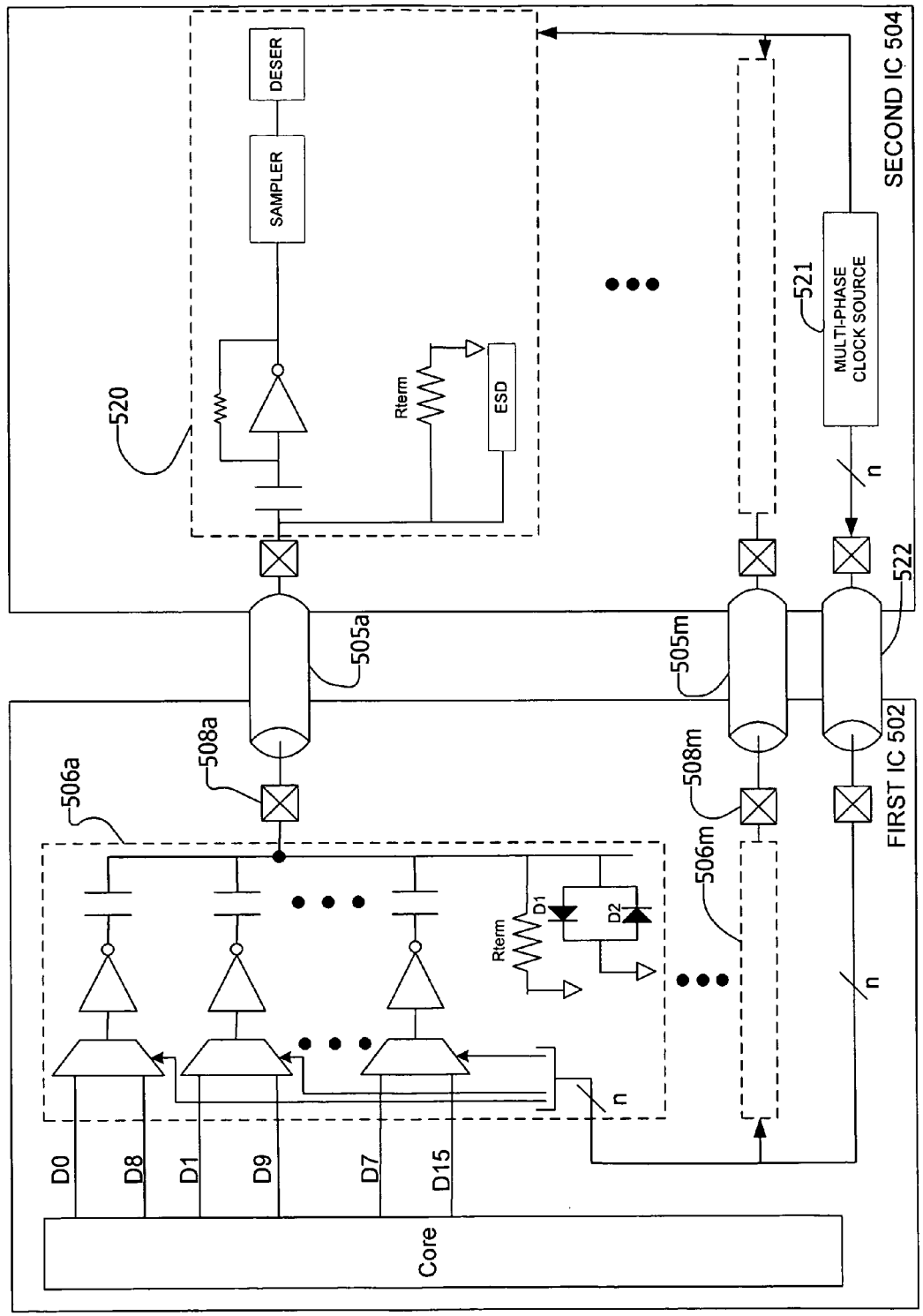
FIG. 5 is a high-level block diagram of a second embodiment of a memory subsystem similar to FIG. 4.

FIG. 5 illustrates a further embodiment of a pulsed signaling system similar to that described in FIG. 4, but optimized for low power applications. Like the system described in FIG. 4, respective first and second ICs 502 and 504 are interconnected via a plurality of signal transmission lines 505a-m. AC-coupled transmitter circuitry 506a-m disposed on the first IC provides a multiplexed pulse signaling output on output pads 508a-m. Receiver circuitry 520 disposed on the second IC receives and processes the pulsed signal stream.

However, unlike the embodiment described above and illustrated in FIG. 4, the timing circuitry for this embodiment resides on the second IC 504. A multi-phase clock source 521 is disposed on the second IC, and feeds a plurality of phase offset clock signals along a clock path 522 (i.e., a point-to-point or multi-drop set of signaling lines for conveying clock signals) to the first IC 502. The offset clock signals may then be used to re-time the input data signals to the AC-coupled transmitter circuitry 506a-m. Similar, related clock signals may also be used to clock the receiver circuitry 520, thereby adding timing stability to the overall system in a closed-loop manner.

In an SIP environment, and especially an SIP-DRAM, employing the multi-phase clock on the controller 504 to clock circuits on the DRAM 502 provides many advantages. Implementing the clock on an ASIC-like IC such as a controller is less complex than doing so on a memory device that is fabricated in accordance with DRAM-optimized processes. Moreover, circuitry on the ASIC is often more power efficient at high signaling rates than similar circuitry formed on the DRAM with its often specialized fabrication process.

It should be noted that the various circuits disclosed herein may be described using computer-aided tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages such as RTL, and formats supporting geometry description languages such as GDSII, GDSIII, GDSIV, CIF, MEBES and any other suitable formats and languages.

Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

What is claimed is:

1. A pulsed signaling multiplexer comprising:
    a first AC-coupled transmitter, the first AC-coupled transmitter having a first driver having a first input to receive first data and a first output, a first AC-coupling element coupled between the first output and a first common output node;
    a second AC-coupled transmitter, the second AC-coupled transmitter having a second driver having a second input to receive second data, and a second output, a second AC-coupling element coupled between the second output and the first common output node; and
    timing circuitry coupled to the first and the second AC-coupled transmitters to enable time-multiplexed data output from the first and second AC-coupled transmitters to the common output node.

2. The pulsed signaling multiplexer of claim 1, wherein the timing circuitry is operative to apply phase offsets to the first data and the second data.

3. The pulsed signaling multiplexer of claim 2, wherein the timing circuitry comprises:
    a first delay element coupled to the first input, and a second delay element coupled to the second input, each delay element including a clock input; and
    a multiphase clock source having a plurality of clock outputs having different phase offsets, each of the plurality of clock outputs coupled to a corresponding delay element clock input.

4. The pulsed signaling multiplexer of claim 3, wherein the delay elements comprise flip-flops.

5. The pulsed signaling multiplexer of claim 3, wherein the multiphase clock source comprises a delay locked loop.

6. The pulsed signaling multiplexer of claim 3, wherein the multiphase clock source comprises a phase locked loop.

7. The pulsed signaling multiplexer of claim 2, wherein the timing circuitry comprises a plurality of programmable delay elements.

8. The pulsed signaling multiplexer of claim 1, wherein the first and second drivers comprise respective first and second inverters.

9. The pulsed signaling multiplexer of claim 1, wherein the first and second AC-coupling elements comprise at least portions of respective first and second series capacitors.

10. The pulsed signaling multiplexer of claim 1, wherein the first and second AC-coupled transmitters are disposed on an integrated circuit.

11. The pulsed signaling multiplexer of claim 10, wherein the integrated circuit comprises a dynamic random access memory.

12. A signal communications apparatus comprising a first plurality of AC-coupled transmitters connected to a first single output terminal, the first plurality of AC-coupled transmitters having respective signal outputs that are multiplexed on the first output terminal and respective AC-coupling elements coupled between the signal outputs and the first output terminal, wherein the AC-coupled transmitters have respective clocks offset in phase to multiplex the respective signal outputs of the AC-coupled transmitters on the first output terminal.

13. The signal communications apparatus of claim 12 comprising a second plurality of AC-coupled transmitters connected to a second single output terminal, the second plurality of AC-coupled transmitters having respective signal outputs which are multiplexed on the second output terminal, wherein the AC-coupled transmitters have respective clocks offset in phase to multiplex the respective signal outputs of the AC-coupled transmitters on the first output terminal.

14. The signal communications apparatus of claim 12 wherein the clocks are offset in equal phase increments.

15. A pulsed signaling system comprising:
    a first integrated circuit including
        an AC-coupled transmitter circuit further including a pulsed signaling multiplexer,
        timing circuitry coupled to the AC-coupled transmitter circuit, the timing circuitry having a clock signal input to receive a clock signal; and
    a second integrated circuit coupled to the first integrated circuit, the second integrated circuit including
        a clock generator to generate the clock signal.

16. The pulsed signaling system of claim 15 wherein the first integrated circuit comprises a memory device.

17. The pulsed signaling system of claim 16 wherein the memory device comprises a dynamic random access memory.

18. The pulsed signaling system of claim 15 wherein the pulsed signaling multiplexer comprises:
    a plurality of AC-coupled transmitters, each AC-coupled transmitter having
        a driver having an input and an output,
        an AC-coupling element coupled to the output,
    wherein the plurality of AC-coupled transmitters are disposed in parallel and coupled to a common output node, and wherein the input to each driver receives data signals offset in phase from signals applied to the other drivers.

19. The pulsed signaling system of claim 15 wherein the second integrated circuit comprises a processor.

20. The pulsed signaling system of claim 19 wherein the processor comprises a memory controller.

21. The pulsed signaling system of claim 15 wherein the clock generator comprises a multi-phase clock source.

22. The pulsed signaling system of claim 21 wherein the multi-phase clock source comprises a delay-locked-loop circuit.

23. The pulsed signaling system of claim 21 wherein the multi-phase clock source comprises a phase-locked-loop circuit.

24. The pulsed signaling system of claim 15 and further including:
    a receiver circuit disposed on the second integrated circuit, the receiver circuit having a data input coupled to the AC-coupled transmitter circuit via a transmission line, and a clock output,
    wherein the clock generator provides clock signals to the AC-coupled transmitter circuit and the receiver circuit.

25. The pulsed signaling system of claim 15 wherein the first and second integrated circuits are disposed on a common substrate.

26. The pulsed signaling system of claim 15 wherein the first and second integrated circuits are configured as a system-in-package.

27. A method of transmitting a plurality of signals on a first integrated circuit, the method comprising:
    providing data signals on a plurality of signal paths;
    phase-shifting the data on the plurality of signal paths by applying timing offsets to the data signals on the plurality of signal paths based on phase-shifted clock signals;
    feeding the phase-shifted data on the plurality of signal paths to a plurality of AC-coupled transmitters;
    generating pulsed representations of the data with the AC-coupled transmitters;
    outputting the pulsed representations from the plurality of AC-coupled transmitters to a common output node;
    wherein the pulsed representations on the common output node define a time multiplexed data stream.

28. The method according to claim 27 wherein the phase-shifted clock signals are generated by a multi-phase clock disposed on the first integrated circuit.

29. The method according to claim 27 wherein the phase-shifted clock signals are generated by a multi-phase clock disposed on a second integrated circuit.

30. A pulsed signaling multiplexer comprising:
    means for providing data signals on a plurality of signal paths;
    means for providing phase-shifted clock signals;
    means for phase-shifting the data on the plurality of signal paths, based on the phase-shifted clock signals;
    means for feeding the phase-shifted data on the plurality of signal paths to a plurality of AC-coupled transmitters;
    means for generating pulsed representations of the data with the AC-coupled transmitters;
    means for outputting the pulsed representations from the plurality of AC-coupled transmitters to a common output node; and
    wherein the pulsed representations on the common output node define a time multiplexed data stream.

* * * * *